(12) United States Patent
Louison et al.

(10) Patent No.: US 6,189,245 B1
(45) Date of Patent: Feb. 20, 2001

(54) STEAM IRON SOLEPLATE WITH SEPARATE STEAMING AND DRYING AREAS

(75) Inventors: Bernard Louison, Francheville; Denis Daulasim, Villeurbanne, both of (FR)

(73) Assignee: Seb S.A., Ecully (FR)

( * ) Notice: Under 35 U.S.C. 154(b), the term of this patent shall be extended for 0 days.

(21) Appl. No.: 09/125,816

(22) PCT Filed: Feb. 25, 1997

(86) PCT No.: PCT/FR97/00332

§ 371 Date: Dec. 22, 1998

§ 102(e) Date: Dec. 22, 1998

(87) PCT Pub. No.: WO97/31146

PCT Pub. Date: Aug. 28, 1997

(30) Foreign Application Priority Data

Feb. 26, 1996 (FR) .................................................. 96 02697

(51) Int. Cl.[7] ...................................................... D06F 75/38
(52) U.S. Cl. .................................................................. 38/93
(58) Field of Search ................................... 37/74, 76, 79, 37/80, 81, 93

(56) References Cited

U.S. PATENT DOCUMENTS

| 184,881 | * | 11/1876 | Mahony | 38/93 |
| 1,859,167 | * | 5/1932 | Prenzel | 38/93 |
| 2,451,984 | * | 10/1948 | Shapiro | 38/93 X |
| 2,750,691 | | 6/1956 | Parr . | |
| 5,799,422 | * | 9/1998 | Demuth et al. | 38/93 |

FOREIGN PATENT DOCUMENTS

| 41 03 794 | 5/1992 | (DE) . |
| 457 689 | 11/1991 | (EP) . |

* cited by examiner

Primary Examiner—Ismael Izaguirre
(74) Attorney, Agent, or Firm—Browdy and Neimark

(57) ABSTRACT

A steam iron soleplate divided into at least one steaming area having a plurality of steam outlets and at least one drying area having one or more grooves but free of steam outlets. The grooves are arranged in a network of furrows defining a pattern of raised lands.

13 Claims, 3 Drawing Sheets

STEAM IRON SOLEPLATE WITH SEPARATE STEAMING AND DRYING AREAS

TECHNICAL FIELD

The present invention is relative to a steam iron soleplate comprising distinct steaming and drying zones.

1. Prior Art

Originally, ironing was effectuated simply with heat and a mechanical action. This was the era of pressing stones up to that of dry irons. However, the need for efficiency and practical observation of phenomena lead certain homemakers to interpose, between the dry iron and the garment, a fabric impregnated with water to improve the quality and the speed of the pressing. This was the establishment of the utilization of the "damp cloth".

With the arrival of technologies for rapidly producing steam, there were created the so-called "steam" irons which permitted, as a result an almost ideal heat carrier, achievement of the moistening of the fibers at the same time as their heating in a very short time, practically in the same time as the application of the mechanical smoothing action.

It has been realized subsequently that this injection of steam left, however, significant residual moisture in the fabric. It is in effect easy to note in the course of ironing that a piece of material, considered to have been pressed and which after folding is put down before being put away, retains significant residual moisture and sometimes requires a non-negligible drying time in a pile before being able to be put away.

The patent DE 452559 relates to a steam iron whose lower soleplate is divided into a first flat forward steaming area having a plurality of steam outlets, and a second rear pressing area normally blocked by a soleplate closing a heated air chamber. Based on the observation that this rear soleplate maintains moisture in the fabric, it is proposed to withdraw it in order to only leave two transverse pressing rollers, the heated air then directly ensuring a simultaneous drying.

However, the first soleplate being slightly inclined toward to the front, flattening of the article can only be approximate. Above all, heating of the fabric solely by mixing with heated air has been found to be too slow to achieve an efficient drying.

The document SU 1796718 discloses a steam iron soleplate provided with four steam outlet channels arranged in a chevron, or herringbone, pattern with the tips oriented toward the front and opening onto lateral edges. Thus, steaming is limited to the level of these channels, the excess steam naturally being evacuated at the sides, thus leaving the rest of the smooth soleplate assigned to pressing and drying.

However, the herringbone form of these channels causes the steam to not truly have the time to achieve its moistening task during forward movement of the iron, this steam being in fact evacuated too rapidly toward the exterior. In addition, these herringbones being distributed on the totality of the soleplate, drying is hardly achieved before a new moistening is effectuated.

An iron soleplate according to the preamble of claim 1 is known from the document EP 621365.

More particularly, the document EP 621365 discloses a steam iron soleplate comprising, from its tip to its heel, a first steam area comprising lateral steam outlets and central steam outlets supplied by two chambers, followed by a first drying area free of steam outlets and extending transversely between the lateral edges of the soleplate, then followed by a second steam area extending equally transversely between the lateral edges and in which open lateral steam outlets supplied by the same chamber as well as central steam outlets supplied from the lateral outlets via longitudinal and transverse channels; this second steam area being itself followed by a second drying area free of steam outlets and extending also over all of the remaining rear surface of the soleplate.

According to the patentee, this distribution of drying and steam areas equally avoids, during pressing, a useless excessive moistening of the articles, and permits performance of a double action thus assuring a better smoothing: articles are during a first time stretched then steamed, then dried and in a second time again steamed then dried.

However, in reality, the smooth heating areas have been found to be too small and too close to the steam areas in order to truly observe a thorough drying and as a result one re-moistens an area impregnated by the first moistening. One then observes that too many creases remain "rounded" and hold for too short a time.

SUMMARY OF THE INVENTION

A first object of the present inventions is to optimize pressing, particularly by substantially improving the fixing of the flatness or of the form of the desired creases by a distinctly more efficient drying.

These goals are achieved by a steam iron soleplate divided into at least one steaming area comprising a plurality of steam outlets, and at least one drying area that does not contain steam outlets, the drying area having one or several grooves, characterized in that the totality of grooves is in the form of a network of furrows defining a pattern of raised lands.

After an extensive study of the pressing mechanism, it has been recognized that the fixation of the flatness or of the form of the desired crease is effectuated under the effect of heat removing moisture by heating of the fabric. Now, it has been noted that steam is accumulated at the center of the soleplate then is displaced towards the rear with the advance of the iron to form a pneumatic cushion. This cushion then has a tendency to lightly raise this rear drying zone, thus hampering the transfer of heat to the article while maintaining a high moisture level.

The first function of these grooves is then to limit the effect of this accumulation of steam between the surfaces in contact, and this in containing it mainly in its volume. The rear heating surface can then come in complete contact with the fabric for an efficient heating.

According to the invention, the set of grooves is present in the form of a network of furrows defining a pattern of raised lands, this network containing a major part of the steam cushion which it evacuates via the edges. Preferably, the furrows present a width comprised between 0.1 and 2 mm with a depth comprised between 0.005 and 1 mm. Equally preferably, the spacing of the furrows is such that the surface of the lands is comprised between 0.5 and 50 mm$^2$.

Due to this network of furrows, the bothersome steam cushion is very rapidly dissipated. In addition, the roughness of the drying surface induced by these furrows adds a mechanical pulling and smoothing effect to the fibers at the moment of evaporation of residual moisture, leaving by this effect a perfectly flat article.

According to an advantageous embodiment, the network of furrows defines a pattern of circular or polygonal lands, these configurations permitting a particularly freely flowing circulation of the steam towards the rear then outside of the soleplate.

Usefully, the surface of the lands in contact with the fabric is structured in the form of submillimeter reliefs permitting at the macroscopic level a mechanical action on the fiber to be combined with an increase in the contact surface improving accordingly heat transmission from the hot soleplate toward the fabric.

Alternatively, or in combination, the grooves are present in the form of steam evacuation channels having a width comprised between 1 and 10 mm with a depth comprised between 0.1 and 1 mm. Advantageously, the channels are oblique from the center toward the rear of the soleplate where they open.

These channels permits collection of the steam, notably that dissipated at the center of the network, to evacuate it as rapidly as possible towards the rear and thus prevents all formation of an undesired pneumatic cushion. This oblique arrangement toward the rear particularly facilitates evacuation of the steam during advance of the iron.

Usefully a cavity is arranged at the middle of the boundary between the forward steam area and the rear drying area and the channels place this central cavity in communication with the lateral or rear edges of the drying area.

The presence of channels in this heating zone permits the steam to circulate in the direction from the central overpressure toward the environment on the edges or the rear. By this fact, the corresponding part of the fabric contains less residual steam and thus less condensed water.

Advantageously, the drying zone forms between ⅔ and ⅓ of the soleplate. Thus, during a normal forward progression of the iron, the fabric is substantially dried as much as it has been moistened.

Another object of the present invention is an iron soleplate in which the structure of the steaming area is designed in relation with that of the drying area in such a manor as to optimize the synergy of the respective functions during pressing.

This object is achieved by the fact that in combination with a rear drying area presenting one or several steam evacuation grooves, the front steaming area comprises a network of longitudinal reliefs for flattening fibers and guiding the steam.

During a thorough study of the pressing mechanism, it was recognized that the major portion of the smoothing and flattening of fiber is effectuated for the most part by the forward steam area, and this all the more so if this area is the most moist and hottest. Above all, the pointed form and the sharp angle of attack of the soleplate on the article in this zone create a "ridge effect" permitting a mechanical smoothing action in the direction of advancement of the iron on the article.

The additional longitudinal reliefs under this forward area multiply first of all this ridge effect in operating in the manner of smoothing "rounded edge knives". This amplification is more pronounced as the reliefs guide the moistening steam and the heating for a controlled distribution on the totality of the article, and as the reliefs are equally heated by this guided steam. Finally, this steam is conducted in a predetermined manner into the rear second area where it is intentionally dissipated in the furrows and ejection channels to permit assuring a good contact between the surfaces of the heating lands and the fabric.

It is certainly known from the documents EP 378479 and EP 457689 to provide pressing irons whose enameled soleplate is complated by thin rectangular reliefs that are arranged longitudinally and in parallel with one another. These reliefs are produced by either silk screening of enamel bands, or by molding and/or machining then enamel coating. However, these longitudinal reliefs have essentially been conceived to permit a reduction of the contact surface of the soleplate with the textiles to be ironed, and thus to reduce the friction coefficient, which improves the "slidability" of the iron. At the most, it has been noted incidentally that these bands simultaneously create channels several microns in depth assuring a relative longitudinal diffusion of the steam in the totality of the soleplate. In contrast, the possibility of multiplying the ridge effect by more accentuated reliefs for a better flattening is not in any way foreseen.

According to a preferred embodiment, the height of the longitudinal reliefs is comprised between 0.05 and 0.5 mm starting from a base located between 0 and 0.5 mm above a plane of contact of the drying area with a fabric to be pressed, this plane of contact being taken as a reference plane.

As a function of the construction of the soleplate and of its particular intended use, one can either establish an elevated base with the lower extremity of the reliefs at a level with the plane of drying contact in order to tend to promote a channeling function of these reliefs, or to establish a base at the same level as the plane of contact and of the protruding reliefs to promote a mechanical ridge effect function, or a slightly elevated base with reliefs that are sufficiently high to combine the two functions.

Usefully, the longitudinal reliefs can have a corrugated form to increase the transverse ridge effect with respect to the direction of normal advance of the soleplate, and to slow the progression of the steam by a baffle effect for an effective moistening with less steam.

When the distribution of the steam outlets is effected along two opposed arcs each extending along one side of the tip of the soleplate then returning toward the center, it is found preferable to produce a boundary in the form of a V between the front first area provided with reliefs and the rear second area with lands. In this configuration, the lateral tongues of the heating lands assure a minimum drying of the article even when the soleplate is advanced sideways.

When the distribution of the steam outlets is effected along two opposed arcs each extending only along one side of the tip of the soleplate, it is found useful to provide a boundary in the form of an inverted V or a W between the front first area provided with reliefs and the rear second area with lands. The central tongue then initiates the heating phase at an early stage to optimize accordingly the drying.

It is an order to note that a pressing iron is normally considered a consumer product which has to be marketed at a low price. The substantial costs foreseeable at the beginning to create a complex three dimensional soleplate can then only be dissuasive. However, certain techniques for obtaining reliefs by molding of aluminum under pressure, or by molding of stainless steel plates, or even by silk screen printing for thin reliefs, permit the costs to be maintained at a reasonable level in view of the remarkable increase in the pressing efficiency. This efficiency is that much more pronounced when the front and rear areas are simultaneously structured according to their individual characteristics taking into account a functional synergy while the additional cost to simultaneously fabricate a second area is low since the same technique is utilized as for the first structure.

BRIEF DESCRIPTION OF THE DRAWINGS

The invention will be better understood from a study of the embodiments given by way of non-limiting example and illustrated in the attached figures in which.

BEST MANNER OF CARRYING OUT THE INVENTION

Figure 1:
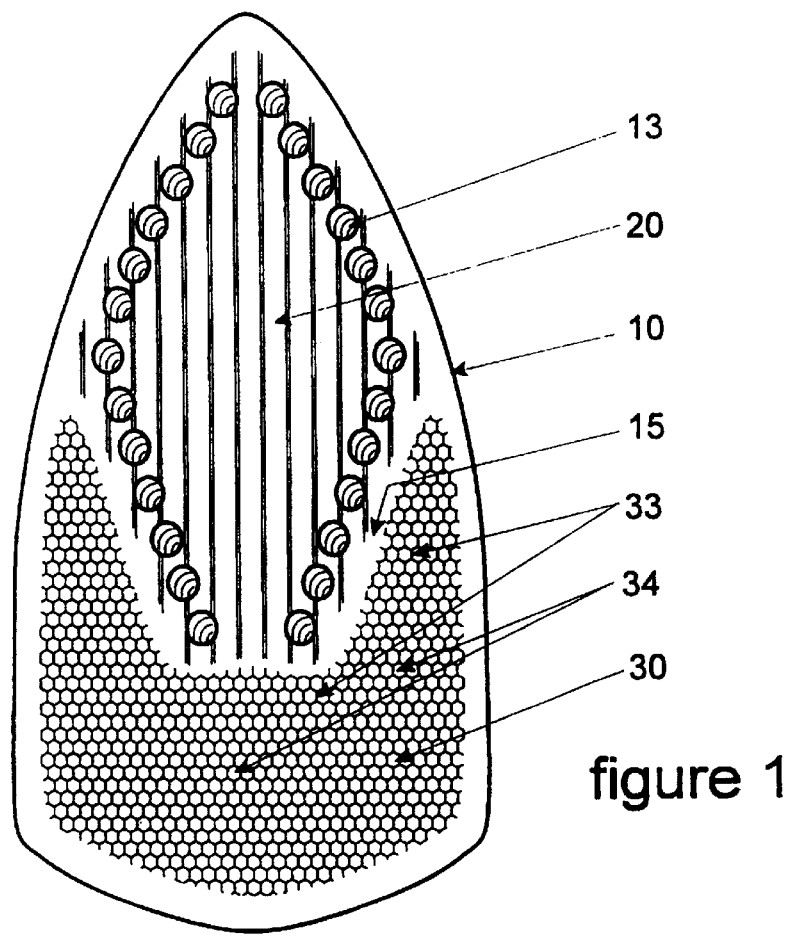
FIG. 1 is a schematic view of a first embodiment of an iron soleplate have two distinct areas of steaming then of drying.

On FIG. 1 is shown the exterior face of a soleplate 10 of a steam iron comprising a front first steaming area 20 and a second rear drying area 30.

In this first example, the configuration of the front area 20 is similar to that of existing iron soleplates. This soleplate is here present in the form of a heating plane substantially in the form of a diamond having rounded edges and corners, and into which open a plurality of steam outlets 13. This set of openings is arranged along two arcs facing one another, each of these arcs commencing by bordering the edges of the front tip up to the median part, then returning progressively toward the center, these arcs being symmetrical with respect to the longitudinal axis.

The lateral edges of this soleplate 10 present a sharp angle to the vertical in order to form, in combination with the front tip, ridges utilized to smooth the fabric being pressed.

The surface of this front area can be of smooth stainless steel or of aluminum coated with enamel. In this illustrated example, there have been formed two straight, thin, longitudinal reliefs by silk screen deposition of complementary enamel layers, these reliefs promoting sliding of this area.

More particularly, according to the invention, this soleplate 10 is completed by a rear area 30 used for drying, the state and morphology of the surface of which are carefully designed at the same time to multiply the ridge effect and to augment the real exchange surface between the fibers of the fabric and the material of the soleplate.

Figure 2:
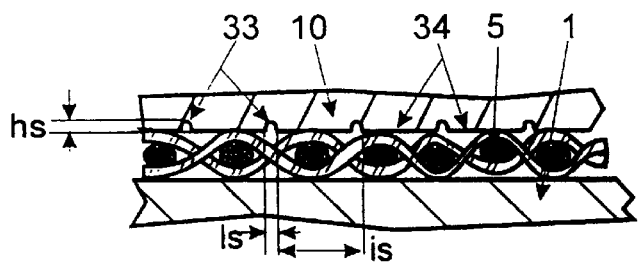
FIG. 2 is a schematic partial cross-sectional view of the rear drying area of the soleplate of FIG. 1.

More specifically, this surface of the soleplate is composed of a set of hexagonal lands 34 in relief separated by furrows 33 intended to limit the accumulation of steam between the contact surfaces of the soleplate and the fabric. As better shown in FIG. 2, the cross section of the furrows 33 have a width "ls" comprised between 0.1 and 2 mm and a depth "hs" comprised between 0.005 and 1 mm. These furrows define lands 34 having a width "is" of the order of 0.8 to 8 mm, or a contact surface with the fabric 5 varying between 0.5 and 50 mm².

Figure 3:
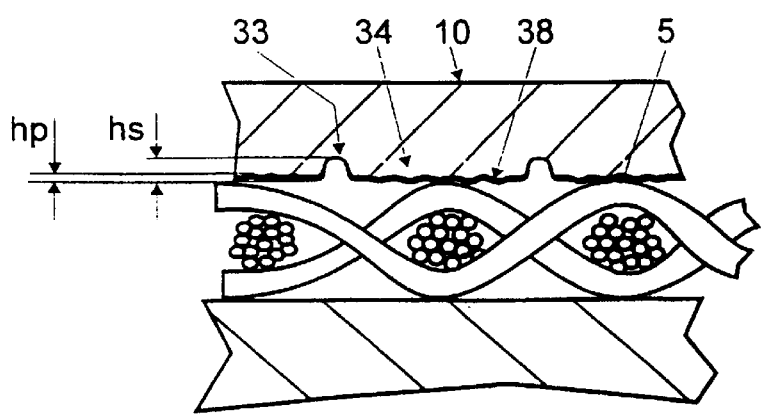
FIG. 3 is an enlarged view of FIG. 2.

In addition, and as is more visible in FIG. 3, the surface state of the part of the lands intended to be in contact with fabric 5 flat on the table 1 is itself reworked to constitute a set of rounded submillimeter mini-reliefs 38. The thickness "hp" of these mini-reliefs is comprised between one-tenth and one-half of the depth "hs" of the furrows 33.

As illustrated, the boundary 15 between the front area 20 and the rear area 30 is present substantially in the form of a V, i.e., the front area 30 comprises two lateral tongues bordering the rear second half of the area 20. The surface area of the front part 20 is here approximately equivalent to that of the rear part 30.

During use of an iron furnished with a soleplate 10, the front area 20 permits, due to its hot surface and the ejection of steam, heating and moistening of the fabric fibers permitting, with the combined action of mechanical flattening effectuated by the sharp edges, to achieve a smoothing and a flattening of the fabric. Throughout the progressive advance of the iron, an area of smoothed fabric and its surrounding steam are found under the rear area 30 having lands. This steam is dissipated among furrows 33 so that the end surfaces of the lands 34 are found in good contact with the fabric in order to effectively transmit thereto heat by conduction. In addition, the mini-reliefs 38 of the lands 34 permit combining at the microscopic level a mechanical smoothing action on the fiber with a still larger contact surface improving accordingly the thermal transmission of this latter. Simultaneously, the steam circulating within furrows 33 escapes at the open sides of the network.

Soleplate 10 is normally expected to be advanced along its median longitudinal axis in such a manor that an area of fabric to be pressed first encounters the front steaming area 20, then the rear drying area 30, a logical ironing sequence. In this case, the V-shaped form of the boundary 15 has the result that, in the case where soleplate 10 is displaced crosswise, an area of the fabric is always seen to pass the steaming area 20, but equally just the same a portion of the drying area 30 constituted by one of the lateral tongues.

Figure 4:
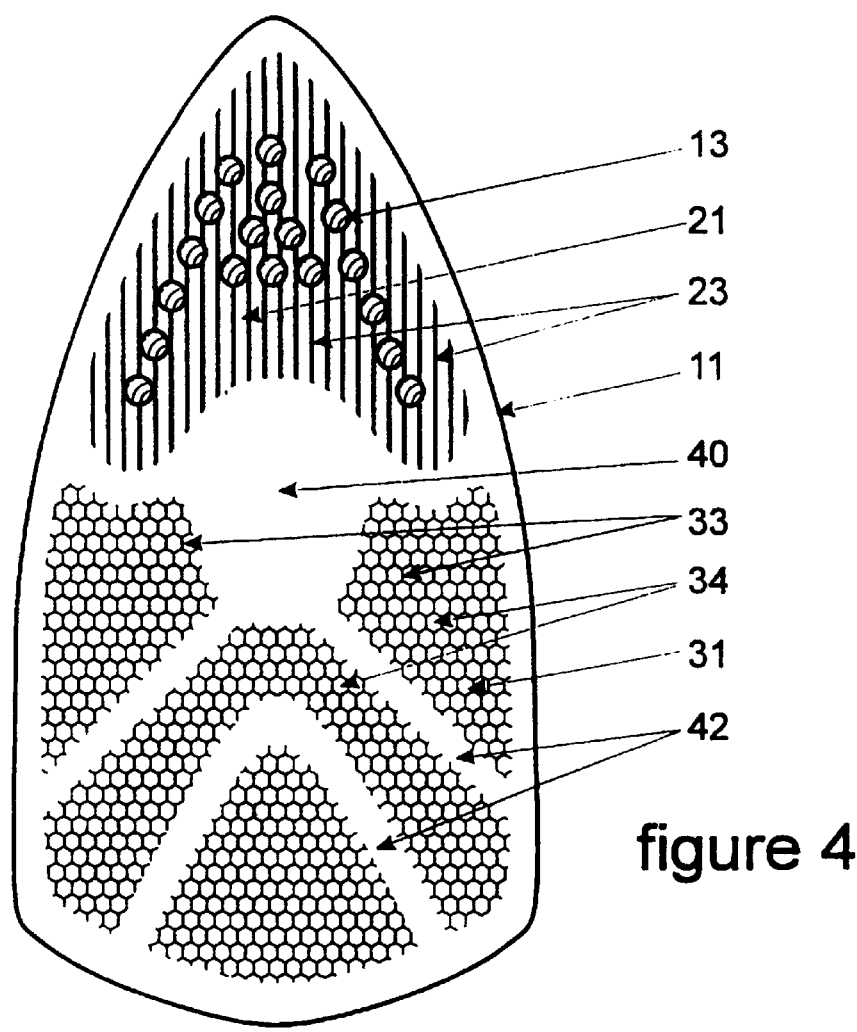
FIG. 4 is a schematic view of a second embodiment of a soleplate.

FIG. 4 illustrates a second embodiment of a soleplate 11 of an iron which is more developed to the extent that the front area 21 is completed by accentuated elongated reliefs 23 in combination with a rear area 31 equally having a network of furrows 33 defining lands 34.

This front area 21 comprises first of all a plurality of steam outlets 13 arranged on the one hand along two arcs bordering the edges of the front tip of soleplate 11 and on the other hand along a central group situated close to the front merging of the two arcs.

Figure 5:
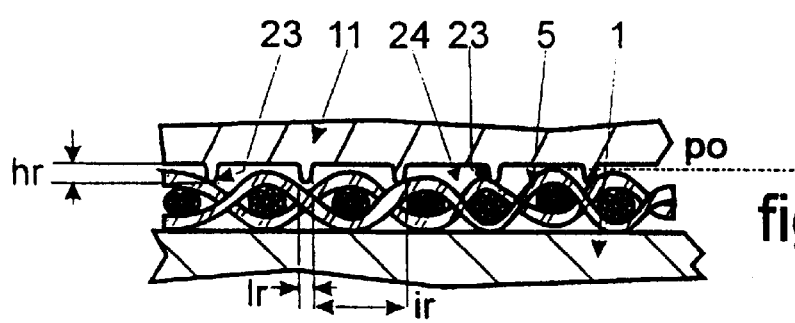
FIG. 5 is a schematic partial cross-sectional view of the forward steaming area of the soleplate of FIG. 4.

Above all and as is more visible in FIG. 5, this front area 21 is provided with straight relief lines 23 here oriented in the direction of normal advance of the soleplate. These continuous or partially interrupted reliefs multiply accordingly the ridge effect utilized for flattening the fiber during its smoothing. These reliefs simultaneous aid a circulation of the steam from the front toward the rear, notably by guiding in the passages 24 laterally defined by each pair of adjacent reliefs, as well as by the surface to the soleplate and the fabric 5 flat on the table 1 situated between two adjacent reliefs.

As is better seen in FIG. 5, these reliefs 33 are relatively accentuated, i.e., their height "hr" is comprised between 0.05 and 0.5 mm. These reliefs can present a rectangular or triangular cross-section oriented toward the bottom, their lower edge being, however, rounded to avoid any risk of premature wear of the fabric. The interval "ir" of these reliefs can be of the order of 1 to 10 mm.

Figure 6:
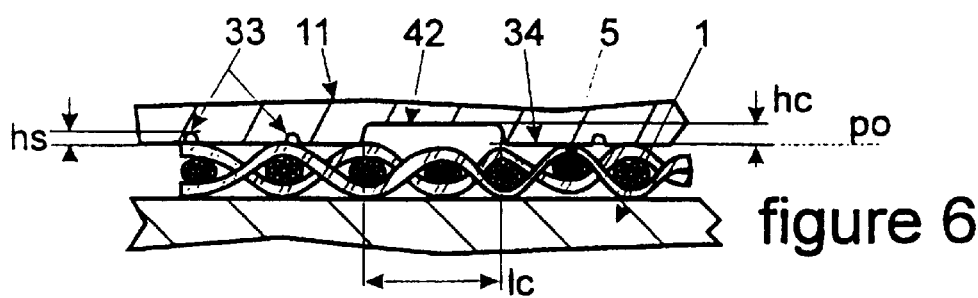
FIG. 6 is a schematic partial cross-sectional view of the rear drying area of the soleplate of FIG. 4.

In considering as reference plane "po" of the soleplate 11, the contact plane of the lands 34 of the rear area 31 with the fabric 5, such as illustrated in FIG. 6, the base of the reliefs 23 can be either level with this plane "po" for a first edge function of smoothing, or be slightly elevated to obtain instead a first function of guiding passage for the steam.

In reference to FIGS. 4 to 6, the rear area 31 comprises first of all a network of furrows 35 defining a pattern of hexagonal lands 34 identical to those described previously with respect to FIG. 1. However, in this version, this rear area 31 is completed by channels 42 in the form of chevrons with the peak oriented toward the front, i.e., oblique lateral branches oriented from the central part toward the lateral or rear edges of the soleplate. These channels are made hollow with respect to the reference plane "po" with a rectangular or trapezoidal passage cross-section, with a depth "he" that can go from 0.1 to 1 mm and a width "lc" comprised between 1 to 10 mm. This arrangement of channels is organized so that the collection and the evacuation of steam during advancement of the iron on the fabric 5 is optimum, no area escaping passage by these channels, then passage by heating parts formed solely by the furrows 33.

As more visible in FIG. 4, the relief area 21 constitutes about the forward third of soleplate 1, and a smooth central area 40 is arranged at the middle of the boundary between the front area 21 and the rear area 31. This central area 40, substantially circular, or even oval in the direction of advancement of the soleplate, gives the forward area 21 a form of an arrowhead. This area 40 can be at the level of the reference plane "po" of contact of the lands 34 with the fabric, or slightly hollow to form a cavity.

These reliefs and furrows can be obtained by numerous known means: stamping, silk screen or stamping deposition, machining, even molding, and this simultaneously or separately.

During use of this soleplate, the part of the fabric located under front area 21 moistened and heated by the accumulation of steam whose escape toward the edges is limited, is subjected to the mechanical effects of rubbing and smoothing amplified by the size of the longitudinal reliefs 23. In this area, the height of the reliefs is such that the contact with the fabric is not in any way affected by the thickness of the steam cushion created at this level.

This quantity of steam thus directed from the front to the rear is found during progression of the iron to be accumulated toward the center notably at the level of the area 40, then toward the rear of the soleplate where there will be created a "steam cushion" phenomenon tending to slightly separate the soleplate from the fabric, this separation being regulated in advance by lateral escape of the steam toward the edges of the soleplate.

This steam accumulated under the central and rear parts achieves an overpressure because of at least three factors. The first is the presence of the residual steam produced by a first generation by expulsion from the outlets 13 in front area 21. This residual steam comprises particularly the remainder of the steam which has not been able to penetrate the fabric due to a loss of pressure occasioned by the passage of the fabric; this phenomenon called "counter pressure" varies according to whether the surface on which ironing takes place is impermeable or porous. A second factor is the presence of second generation steam, i.e., that which is created by the hot surface of the rear area re-vaporizing the water condensed in the fibers of the fabric, originating from the vapor ejected in the front area. This production of vapor adds to the preceding. The third factor is the pressure with which the housewife bears on the iron.

The presence of the network of furrows 33 and above all of the channels 42 in the rear area 31 permits this substantial quantity of steam to circulate in the direction from the central overpressure toward the free environment at the lateral edges. By this fact, the corresponding part of the fabric contains less residual steam, thus less re-condensed water, and the surface of the lands 34 can effectively be in contact with the fabric 5.

Figure 7:
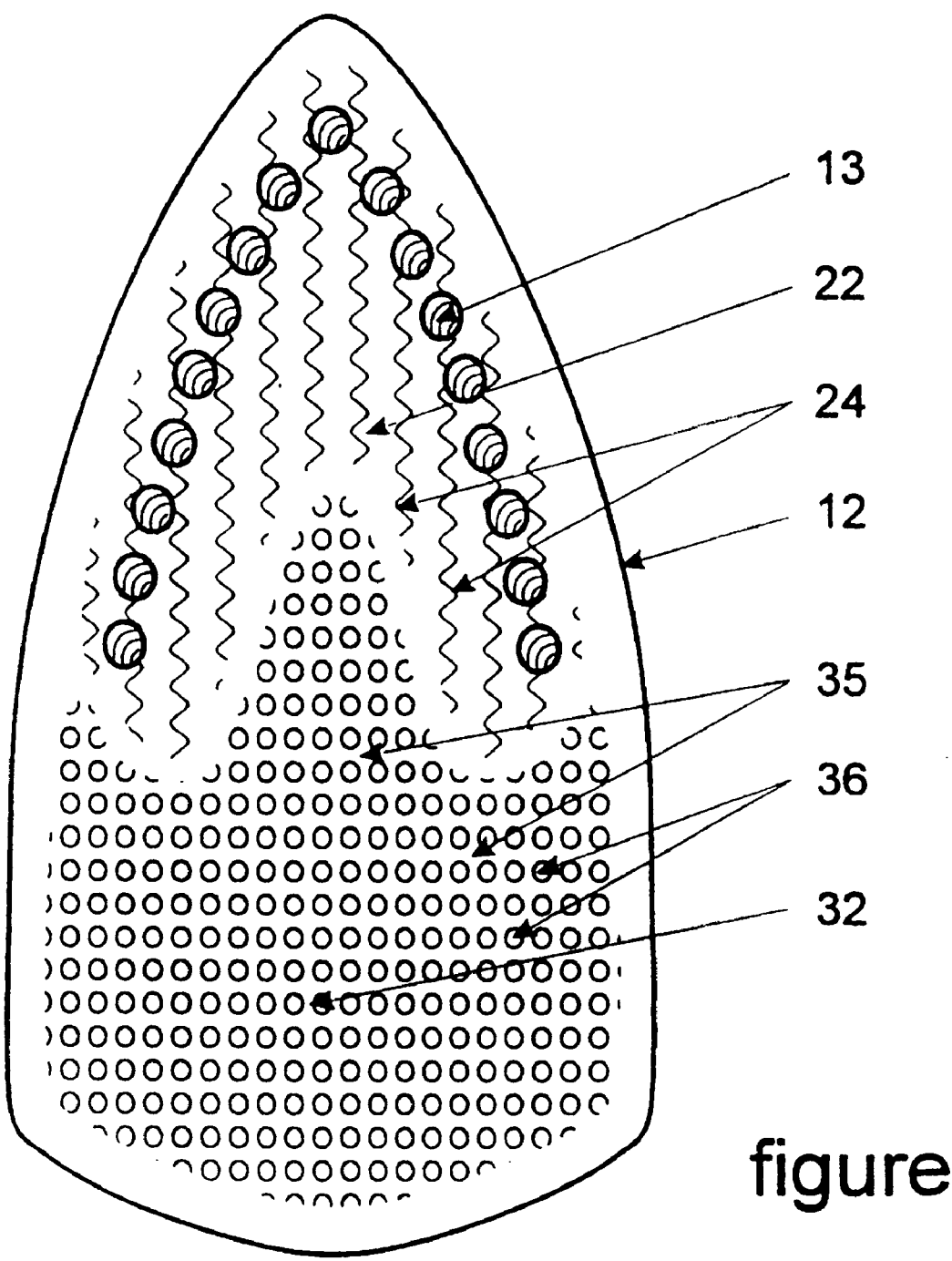
FIG. 7 is a schematic view of a third embodiment of a soleplate.

On FIG. 7 is illustrated a third variant of an ironing soleplate 12 whose front area 22 in the form of an arrowhead is followed by a rear area 32 with lands 36 presenting a central tongue advancing in the middle of the front area 22, the boundary between the two areas thus being in the form of a W. The surface areas of the areas 22 and 32 are here substantially identical.

In this example, the reliefs 24 of the front area have a sinusoidal form adding a ridge effect of transverse smoothing in addition to the longitudinal smoothing. Moreover, the lands 36 of the rear area are here circular, the furrows 35 are then present in the form of a square pattern of cruciform design with concave arms. In this case, the surface area of the furrows 35 is practically identical to that of the circular lands 36.

The invention is not in any way strictly limited to the examples of embodiments described previously, but encompasses numerous modifications or improvements. Notably, the reliefs of the front area can be discontinuous, for example, by being presented in the form of a plurality of segments oriented at 45° and interwoven in staggered rows thus presenting as much ridge effects in the longitudinal direction as in the transverse. Alternatively, these reliefs can be curved and oriented toward the interior to contain the steam or, conversely, oriented toward the exterior to very rapidly eject this steam well before the rear drying area.

In addition to the circular or hexagonal forms illustrated for the drying lands, one can equally envision other forms such as diamonds or discs which are alternately concave and convex or other examples of forms already utilized for floor tiling.

One can equally envision that the front steaming and rear drying areas are heated by individual electrical resistances, regulated at distinctly assigned temperatures.

POSSIBILITIES OF INDUSTRIAL APPLICATION

The invention finds its application in the field of steam irons.

What is claimed is:

1. Steam iron soleplate (10, 11, 12) divided into at least one steaming area (20, 21, 22) comprising a plurality of steam outlets (13), and at least one drying area (30, 31, 32) free of steam outlets, the drying area presenting one or several grooves (33, 35, 42), characterized in that a set of grooves is present in the form of a network of furrows (33, 35) defining a pattern of raised lands (34, 36).

2. A soleplate according to claim 1, characterized in that the furrows have a width comprised between 0.1 and 2 mm with a depth comprised between 0.005 and 1 mm.

3. A soleplate according to claim 1, characterized in that the surface of the lands (34, 36) is comprised between 0.5 and 50 $mm^2$.

4. A soleplate according to claim 1, characterized in that the network of furrows defines a pattern of circular (36), polygonal (34) lands.

5. A soleplate according to claim 1, characterized in that the surface of the lands (34, 36) is structured in the form of submillimeter reliefs (38).

6. A sole plate according to claim 1, characterized in that the grooves are present in the form of channels (42) for evacuation of steam having a width comprised between 1 and 10 mm, with a depth comprised between 0.1 and 1 mm.

7. A soleplate according to claim 6, characterized in that the channels (42) are oblique from the center toward the rear of the soleplate where they open.

8. A soleplate according to claim 7, characterized in that a cavity (40) is arranged at the middle of the boundary between the front steaming area (21) and the rear drying area (31), and in that the channels (42) place this central cavity in communication with the lateral or rear edges of the drying area.

9. A soleplate according to claim 1, characterized in that the drying area (30, 31, 32) forms between ⅔ and ⅓ or the soleplate (11, 12).

10. A soleplate according to claim 1, characterized in that the front steaming area (20, 21, 22) comprises a network of longitudinal reliefs (23, 24) for flattening fiber and guiding the steam.

11. A soleplate according to claim 10, characterized in that the height (hr) of the longitudinal reliefs (23, 24) is comprised between 0.05 and 0.5 mm starting from a base situated between 0 and 0.5 mm above the plane (po) of contact of the drying area (30, 31, 32) with a fabric to be pressed.

12. A soleplate according to claim 10, characterized in that the longitudinal reliefs (22, 23) have an undulating form.

13. A soleplate according to claim 12, characterized in that the boundary between the first front steaming area (20) and the second rear drying area (30) is in a V, in an inverted V or in a W.

* * * * *